(12) United States Patent
Verbeke et al.

(10) Patent No.: US 11,887,480 B2
(45) Date of Patent: Jan. 30, 2024

(54) CONTEXT AWARE SAFETY ALERTS

(71) Applicant: HARMAN INTERNATIONAL INDUSTRIES, INCORPORATED, Stamford, CT (US)

(72) Inventors: Joseph Verbeke, San Francisco, CA (US); Sven Kratz, Saratoga, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 193 days.

(21) Appl. No.: 16/993,155

(22) Filed: Aug. 13, 2020

(65) Prior Publication Data

US 2022/0051567 A1 Feb. 17, 2022

(51) Int. Cl.
*G08G 1/16* (2006.01)
*B60W 30/08* (2012.01)

(52) U.S. Cl.
CPC ............. *G08G 1/166* (2013.01); *B60W 30/08* (2013.01); *G08G 1/161* (2013.01); *B60W 2554/4029* (2020.02); *B60W 2554/4047* (2020.02)

(58) Field of Classification Search
CPC ....... G08G 1/166; G08G 1/161; B60W 30/08; B60W 2554/4029; B60W 2554/4047
See application file for complete search history.

(56) References Cited

U.S. PATENT DOCUMENTS

| | | | |
|---|---|---|---|
| 2011/0210866 A1* | 9/2011 | David | G08G 1/166 340/901 |
| 2018/0173230 A1* | 6/2018 | Goldman-Shenhar | B60W 50/14 |
| 2019/0051150 A1* | 2/2019 | Anderson | G08G 1/07 |
| 2019/0319768 A1* | 10/2019 | Wu | H04W 72/0446 |
| 2020/0047668 A1* | 2/2020 | Ueno | G08G 1/166 |
| 2020/0160714 A1* | 5/2020 | Inaba | B60W 30/095 |
| 2022/0020273 A1* | 1/2022 | Ueno | G05D 1/0016 |
| 2022/0039054 A1* | 2/2022 | Balasubramanian | H04W 4/20 |

* cited by examiner

*Primary Examiner* — Daryl C Pope
(74) *Attorney, Agent, or Firm* — Artegis Law Group, LLP

(57) ABSTRACT

A context-aware safety device includes a wireless transceiver, a memory storing an application, and one or more processors. When executing the application, the one or more processors are configured to determine a context of a safety device, configure an alert based on the determined context, and broadcast the configured alert using the wireless transceiver.

18 Claims, 7 Drawing Sheets

CONTEXT AWARE SAFETY ALERTS

BACKGROUND

Field of the Various Embodiments

The various embodiments relate generally to safety alerts, and more specifically, to situation and context-aware alerts.

Description of the Related Art

Autonomous vehicles (AVs) continue to be tested on public roads and are likely to become the default method of on-roadway transportation. As the use of AVs increases, so does the likelihood that AV control algorithms will fail, resulting in serious injury to or the death of a pedestrian, bicyclist, and/or the like. While AV algorithms are advanced, and continuously improving, no algorithm is without its edge cases. AV algorithms typically rely on external facing sensors (e.g., cameras, radar, LIDAR, ultrasound, etc.) and data from databases (e.g., maps) to understand their immediate environment. The reliance of AV algorithms on external sensors and databases is generally sufficient most of the time. However, this reliance of AV algorithms on sensors and databases cannot guarantee that pedestrians, bicyclists, and/or the like are safe all the time.

AVs currently rely on sensors to detect other vehicles, obstacles, road conditions and hazards, and, importantly, persons and other vulnerable road users, such as pedestrians, bicyclists, children crossing or playing in or near streets, and/or the like. Typically, an AV will rely on software and artificial intelligence systems to process information from the sensors and make determinations about what the sensors detect. The software and artificial intelligence systems may also process information from various local and networked systems and databases, including maps, traffic, location information from Global Navigation Satellite Systems (e.g., GPS, GLONASS, COMPASS MEO, Galileo), and/or the like. The software and artificial intelligence systems may include or be connected to communication systems that implement the IEEE 802.11p standard, which defines the protocols for Wireless Access in Vehicular Environments (WAVE) networks. An AV can use WAVE to send and receive information to other AVs, such as location information. AVs can use the information processed by the software and artificial intelligence systems to determine which roads to take, change the path previously chosen while driving, identify other vehicles and obstacles on the road, follow traffic rules, attempt to avoid accidents, and/or the like.

While there is continuous improvement to the algorithms and systems used in AVs, accidents with AVs continue to happen as well. Individuals who intend to walk into or cross a street on which AVs are traveling may have limited options with regard to their own safety. For example, such individuals can wait for a particular AV to pass before entering the roadway, but this would be impractical as AVs become more commonplace. Individuals can also choose to wear a safety or reflective vest, a blinking vest, or a similar piece of clothing to make themselves more visible to the sensors of AVs; however, safety garments might be impractical (e.g., it might be impractical or not possible for a parent with a baby in a stroller or an adult walking with a toddler to wrap the stroller with the safety garment, and such garments might be inadequate in size or effectiveness when worn by a small child) and might be unavailable (e.g., when a person goes out for an activity and unexpectedly has to cross a street to go somewhere else), or unfashionable (e.g., persons may choose not to wear safety clothing due to appearance concerns and/or social pressure).

In some cases, before entering or while on a roadway, individuals can generally see a driver in a car to verify whether the driver has detected their presence. The individual and the driver can communicate at a distance allowing the individual to solicit acknowledgment and/or approval from the driver to proceed on the roadway through eye contact, head and body movements, hand gestures, and/or the like. However, pedestrians, cyclists, human drivers, and other road users do not have a way of communicating with or receiving similar, acknowledgment and/or approval from AVs. Furthermore, AVs do not have a way to communicate with pedestrians and other road users. For example, in an emergency, it would not be possible for a pedestrian to inform an AV that the AV should stop. Similarly, first responders, such as police, firefighters, medical personnel, and/or the like, would not be able to inform an AV that the first responders may need to enter or cross the planned travel path of the AV, or that the AV should take a different path or stop due to an emergency.

As the foregoing illustrates, what is needed are more effective techniques for enabling communication with AVs and for alerting AVs with situational and contextual information.

SUMMARY

One or more embodiments set forth a safety device. The safety device includes a wireless transceiver, a memory storing an application, and one or more processors. When executing the application, the one or more processors are configured to determine a context of a safety device, configure an alert based on the determined context, and broadcast the configured alert using the wireless transceiver.

Further embodiments provide, among other things, a computer-implemented method and one or more computer readable media configured to implement the application set forth above.

At least one advantage and technological improvement of the disclosed techniques is a wearable or other easily carried safety device that can provide alerts to nearby AVs of the presence of a user (e.g., a pedestrian or other individual) on or near roadways. Accordingly, the safety device can affirmatively notify the AVs of the presence of the user rather than the user having to passively rely on the environment sensors of the AV to detect the user. Additionally, the alerts can be used to provide an actual position of the user rather than a position that the AV has to infer from environmental sensor data. Further, the safety device can adjust the properties and/or the content of the alerts manually based on user preference and/or automatically based on contextual and/or situational information. Another advantage and technological improvement is that the safety device can be used to request an AV to perform a safety action. A further advantage and technological improvement is that the safety device can interact with other roadway systems, such as traffic lights, crosswalks, and/or the like to further improve the safety and/or convenience of the user.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Context-Aware Safety Devices

Figure 1:
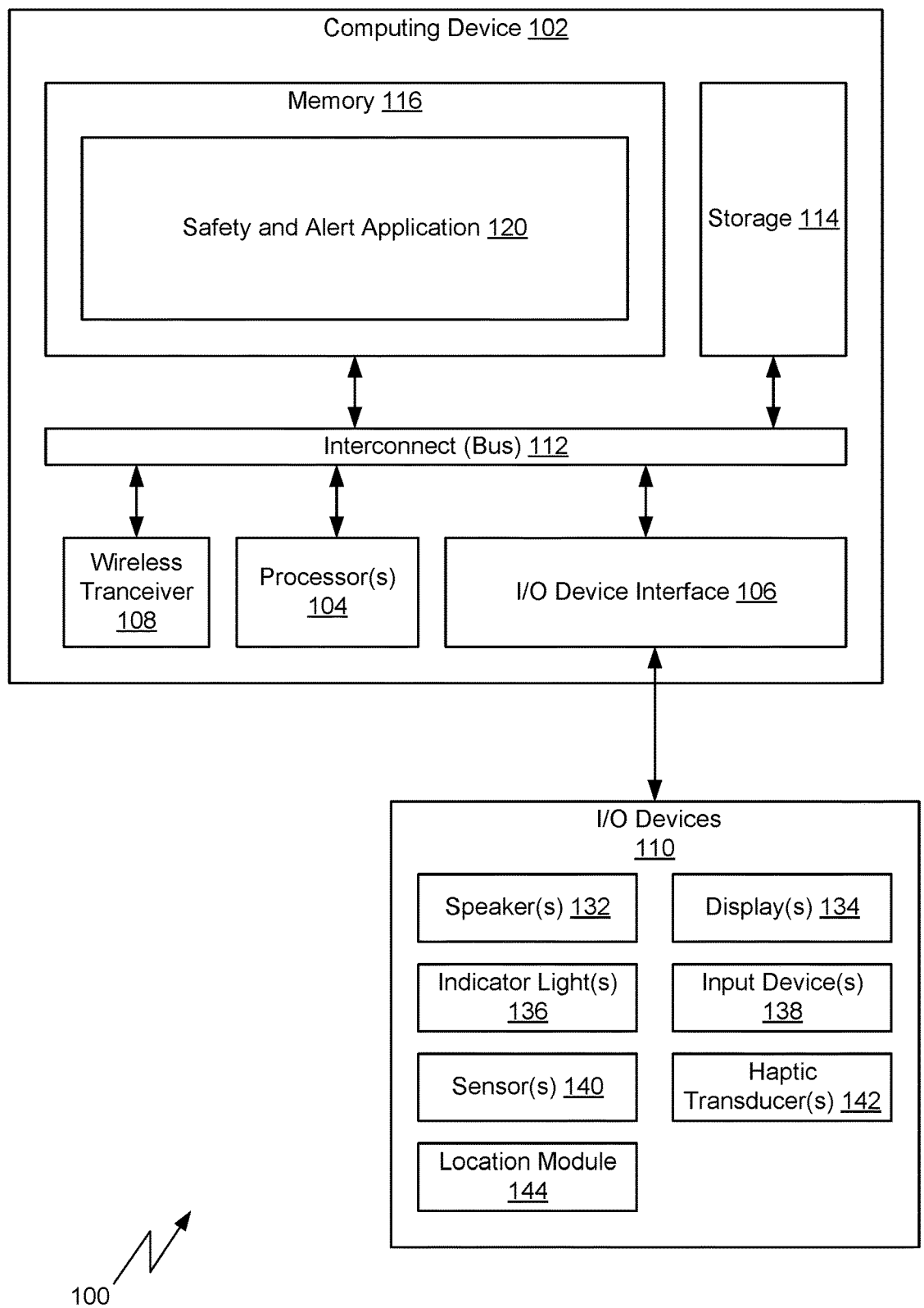
FIG. 1 illustrates a block diagram of a safety device, according to one or more aspects of the various embodiments.

FIG. 1 illustrates a block diagram of a safety device 100. Safety device 100 may interact with one or more AVs, traffic control systems, and/or the like. Safety device 100 includes a computing device 102. As shown, computing device 102 includes, without limitation, one or more processors 104, I/O device interface 106, wireless transceiver 108, interconnect 112, storage 114, and memory 116. The one or more processors 104 and memory 116 may be implemented in any technically feasible fashion. For example, and without limitation, in various embodiments, any combination of the processor 104 and the memory 116 may be implemented as a stand-alone chip or as part of a more comprehensive solution that is implemented as an application-specific integrated circuit (ASIC), a system-on-a-chip (SoC), and/or the like. The one or more processors 104, I/O device interface 106, wireless transceiver 108, storage 114, and memory 116 may be communicatively coupled to each other via interconnect 112.

The one or more processors 104 may include any suitable processor, such as a central processing unit (CPU), a graphics processing unit (GPU), an application-specific integrated circuit (ASIC), a field programmable gate array (FPGA), a tensor processing unit (TPU), any other type of processing unit, or a combination of multiple processing units, such as a CPU configured to operate in conjunction with a GPU. In general, each of the one or more processors 104 may be any technically feasible hardware unit capable of processing data and/or executing software applications and modules.

Storage 114 may include non-volatile storage for applications, software modules, and data, and may include fixed or removable disk drives, flash memory devices, and CD-ROM, DVD-ROM, Blu-Ray, HD-DVD, or other magnetic, optical, solid state storage devices, and/or the like.

Memory 116 may include a random access memory (RAM) module, a flash memory unit, or any other type of memory unit or combination thereof. The one or more processors 104, I/O device interface 106, and wireless transceiver 108 are configured to read data from and write data to memory 116. Memory 116 includes various software programs and modules (e.g., an operating system, one or more applications) that can be executed by the one or more processors 104 and application data (e.g., data loaded from storage 114) associated with said software programs.

In some embodiments, computing device 102 is communicatively coupled to one or more wireless networks (not shown) using wireless transceiver 108. Each wireless network may be any technically feasible type of wireless communications network that allows data to be exchanged between computing device 102 and other systems or devices (not shown), such as an AV, a traffic control system, and/or the like. For example, a wireless network may include a Wireless Access in Vehicular Environments (WAVE) network or similar network, an IEEE 802.11p network, a Bluetooth® network, a Wi-Fi network, a cellular data network, a near field communication network, a visible light communication network, an acoustic communication network, and/or the like. Wireless transceiver 108 includes wireless communication circuitry which may include one or more antennae, one or more transmitters, one or more receivers and/or the like. Wireless transceiver 108 may be configured to communicatively couple computing device 102 to one or more AVs, traffic control systems, and/or the like either directly, indirectly (e.g., communicatively couple the safety device to a particular AV through an intermediary AV), and/or through one or more intervening networks. Wireless transceiver 108 may be configured to broadcast a signal and/or enable wireless connectivity to other devices, using one or more of peer-to-peer, device-to-device, device-to-vehicle, vehicle-to-device, and/or other arrangements. In some embodiments, wireless transceiver 108 is firmware, hardware, software, or a combination of firmware, hardware, and/or software, that is configured to connect to and interface with the one or more networks. Although not shown, in FIG. 1, safety device 100 may optionally include one or more wired network interfaces for coupling safety device 100 to one or more wired networks.

I/O devices 110 may include devices capable of providing input, such as a touchpad, a touch-sensitive screen, buttons, knobs, dials, sliders, joysticks, microphones, and so forth, as well as devices capable of providing output, such as a display device, audio speaker, indicator lights, etc. For example, I/O devices 110 may include one or more audio speakers 132, one or more displays 134, various input device(s) 138 (e.g., buttons, knobs, dials, touchscreen displays, microphones, speech recognition via hardware and/or software, etc.), and indicator light(s) 136 (e.g., indicators on the safety device, directional lights, lights and/or waves that transmit information, etc.). Examples of display(s) 134 include, without limitation, LCD displays, LED displays, touch-sensitive screens, transparent displays, projection systems (e.g., a heads-up display projection system), optical combiners, and/or the like. Additionally, I/O devices 110 may include devices capable of both receiving input and providing output, such as a touch-sensitive screen, a universal serial bus (USB) port, and/or the like. In some examples, display(s) 134 and/or other I/O devices 110 may be associated with another device, such as a paired smart phone and/or tablet carried by the user.

I/O devices 110 further include one or more sensors 140 that measure and/or monitor various position and/or movement characteristics of a user wearing or carrying the safety device and/or the environment around the user. Sensor(s)

140 include one or more imaging devices (e.g., an RGB camera, an infrared camera, a depth camera, a laser-based sensor, an ultrasound-based sensor, and/or the like). The imaging devices may include one or more imaging devices directed to the front of the user, in the direction in which the user is looking, and/or one or more other directions to capture a 360 degree view around the user and safety device 100. The imaging device may be adjusted automatically and/or manually to position or configure the field of the view of the imaging device to cover and/or focus on the user, to near and/or far away objects in front and/or around the user, and/or the like. Sensor(s) 140 may include additional sensors, examples of which include, without limitation, distance sensors, ranging sensors, accelerometers, gyroscopes, magnetometers, inertial measurement units (IMU), biometric sensors, temperature sensors, barometric sensors, humidity sensors, altitude sensors, rotation sensors, vibration sensors, door closure sensors, light sensors, photoresistors, photodetectors, microphones, other technologically feasible sensors, and/or the like. Sensor (s) 140 may be biometric sensors that detect heart rate, galvanic skin response (GSR), electroencephalogram waves or signals (EEG), and/or the like, and may be used to detect if safety device 100 is being worn and the biometric context of the user in operation. Sensor(s) 140, individually and/or in combination with other I/O devices 110, may be configured to detect whether safety device 100 is inside or outside of a building or a vehicle, whether safety device 100 is being carried and/or used by a user, the positions and velocities of objects near safety device 100, and/or the like.

I/O devices 110 further include haptic transducer(s) 142. Haptic transducer(s) 142 may be configured to operate in one or more modes which may include sensing tactile input and/or causing haptic output. Different types of haptic outputs may be configured to convey various meanings (e.g., different alert types, a direction in which a user should move, etc.) to a user depending on the haptic sensation generated by haptic transducer(s) 142. Haptic transducer(s) 142 may include without limitation, actuators, springs, motors, relays, servomechanism, piezoelectric actuators or transducers, electroactive polymers, ultrasonic transducers, micro-electromechanical systems (MEMS), and/or the like.

I/O devices 110 further include a location module 144. Location module 144 may be configured to provide computing device 102 with data or information to allow computing device 102 to determine a position, a velocity, and/or the like of the user and/or safety device 100 using any technically feasible means. Location module 144 may include its own sensors, transmitters, receivers, transducers, hardware, software, antennas, and/or the like, or receive signals and/or information from sensor(s) 140. In some embodiments, location module 144 may request data from external databases through wireless transceiver 108 and/or through other I/O devices 110. In some embodiments, location module 144 may determine the position of safety device 100 using a radio navigation system such as a Global Navigation Satellite Systems (e.g., GPS, GLONASS, COMPASS MEO, Galileo), and/or the like. In some embodiments, location module 144 may determine the position of safety device 100 using Wi-Fi access point data, cellular network tower information, radio and/or television antenna information, and/or the like.

Memory 116 includes a safety and alert application 120. Safety and alert application 120 may be stored in and loaded from storage 114. In some embodiments, safety and alert application 120 determines a context of safety device 100 (e.g., receives and/or determines movement of the user or safety device 100, positions of safety device 100, weather conditions, traffic conditions, user input, and/or the like), configures an alert based on the context, and broadcasts the configured alert via wireless transceiver 108. In some embodiments, safety and alert application 120 determines a position and/or a velocity of safety device 100 using location module 144, configures an alert based on the position and/or velocity, and broadcasts the configured alert via wireless transceiver 108. Safety and alert application 120 may then receive position and/or velocity information from one or more AVs, display the position and/or velocity information to the user, and determine whether there is a high risk of a collision between the user and one of the AVs. When safety and alert application 120 determines that there is a high risk of a collision with the AV, then safety and alert application 120 may alert the user of the high risk of the collision, request that the AV perform a safety operation, and then determine whether the AV has acknowledged the request to perform the safety operation. Safety and alert application 120 may further broadcast one or more user requests. Operation of safety device 100 and safety and alert application 120 are further described below in conjunction with FIGS. 2-6.

Figure 2A:
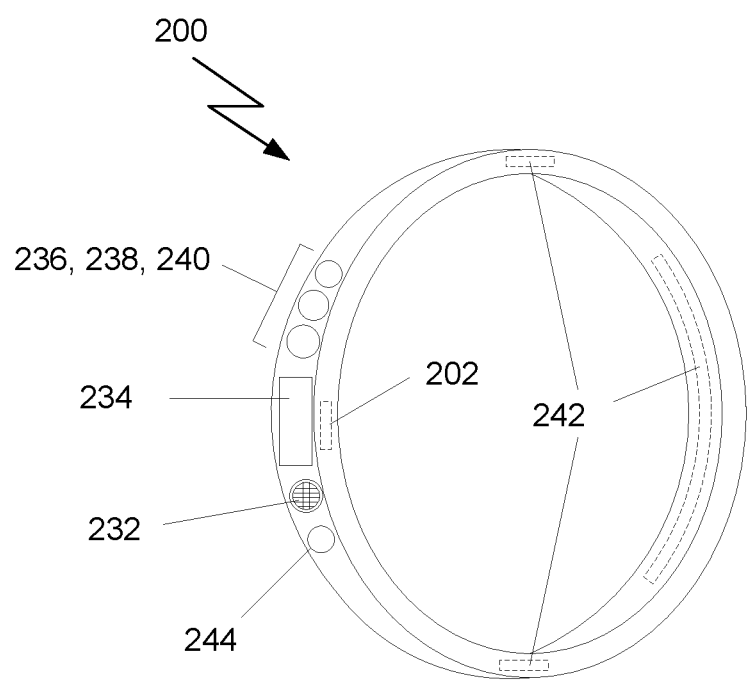
FIGS. 2A and 2B illustrate perspective views of different embodiments of a safety device, according to one or more aspects of the various embodiments.

FIG. 2A illustrates a safety device 200 in a perspective view of an exemplary embodiment according to one or more aspects of the various embodiments. In some embodiments, safety device 200 is consistent with safety device 100. As shown, safety device 200 is integrated into a bracelet. Safety device 200 may be made of different types of metals, rubbers, silicone, or other materials, or a combination of materials, and may have clasps or other mechanisms to assist the user in wearing safety device 200. Safety device 200 includes a computing device 202, which may be consistent with computing device 102. Computing device 202 may store one or more user profiles, default settings, previous settings, preferences, and/or the like.

Safety device 200 includes one or more speakers 232, which may be consistent with speaker(s) 132. Speaker(s) 232 may be used to provide audio alerts and/or other messages to the user, as well as audio, music, entertainment, phone call audio, and/or the like.

Safety device 200 further includes one or more indicator lights 236. In some embodiments, indicator light(s) 236 are consistent with indicator light(s) 136. Indicator light(s) 236 may provide alert information via lighting, a flashing pattern, a color, or any combination thereof. Indicator light(s) 236 may also provide status information (e.g., an operating mode) of safety device 200. Indicator light(s) 236 may be located at different positions of safety device 200, making at least part or a set of indicator light(s) 236 observable regardless of movement or position of safety device 200. In some embodiments, indicator light(s) 236 are located on the exterior of safety device or are visible through a transparent and/or translucent portion of safety device 200.

Safety device 200 also includes input device(s) 238. In some embodiments, input device(s) 238 are consistent with input device(s) 138. Input device(s) 238 allow the user to interact with safety device 200 and computing device 202. For example, input device(s) 238 may allow a user to turn safety device 200 on and off, to start or stop location alert broadcasting, change an operating mode, select a preference from a plurality of preferences in the display, or other functions of safety device 200, or send requests to an AV, a traffic control system, and/or the like.

Safety device 200 additionally includes sensor(s) 240. In some embodiments, sensor(s) 240 are consistent with sensor (s) 140. In some embodiments, sensor(s) 240 may include one or more contact, pressure, capacitive, biometric, and/or other sensors (e.g., on an inner surface of safety device 200) to detect whether safety device 200 is being worn by a user. Sensor(s) 240 may detect contact with the user, GSR of the user, pressure between sensor(s) 240 and/or the user, the heart rate of the user and/or the like. Sensor(s) 240 may detect environment context and parameters, such as objects surrounding the user, ambient light, signals from other devices, still and dynamic images such as photos and video, sounds and ultrasound, weather conditions, and/or the like. In some embodiments, sensor(s) 240 may include one or more ranging and/or other sensors to detect or sense proximity of nearby objects, such as one or more AVs and/or the like.

In some embodiments, safety device 200 may optionally include a location module 244 to determine a position of safety device 200 to provide to other devices (e.g., an AV) and/or to help determine an operating mode and/or context of safety device 200. In some embodiments, location module 244 is consistent with location module 144.

In some embodiments, safety device 200 may optionally include a display 234, which may be consistent with display 134. Display 234 may provide color, flashing, lighting, text, and/or graphic alert information (e.g., navigation map, optionally annotating the map with positions of nearby AV(s). Display 234 also may present a user interface and information. In some examples, display 234 may receive user input, such as by being touch sensitive.

Safety device 200 further includes one or more haptic transducers 242, which may be consistent with haptic transducer(s) 142. FIG. 2A shows haptic transducer(s) 242 located inside safety device 200. However, haptic transducer(s) 242 may be located at any technically feasible location, such as on a surface of safety device 200 and/or protruding from safety device 200. Haptic transducer(s) 242 may be located at one location on safety device 200 and/or may be located at multiple locations on safety device 200. Haptic transducer(s) 242 may be configured to provide haptic sensations or effects of varying types, strengths, frequencies, etc. Different sensations/effects may be used to convey different information and/or different alerts to the user. Haptic transducer(s) 242 may be configured to provide haptic sensations or effects in one or more general areas, throughout the whole safety device 200, and/or through one or more localized areas of safety device 200.

Although FIG. 2A shows safety device 200 as a bracelet, safety device 200 may instead be implemented or embodied in other wearable devices. Exemplary embodiments include necklaces, neck chains, collars, chokers, pendants, finger rings, earrings, thimbles, ankle bracelets, and/or other jewelry. Additional exemplary embodiments include belts, belt buckles or belt fasteners, brooches, badges, pins, and/or the like. In some embodiments, safety device 200 may be integrated into one or more pieces of clothing (e.g., scarfs, shoes, hats, caps, and/or the like). In some embodiments, safety device 200 may be integrated into two or more wearable items, such as a belt buckle containing a computing device consistent with computing device 202 combined with a belt that has haptic transducers consistent with haptic transducer(s) 242.

Figure 2B:
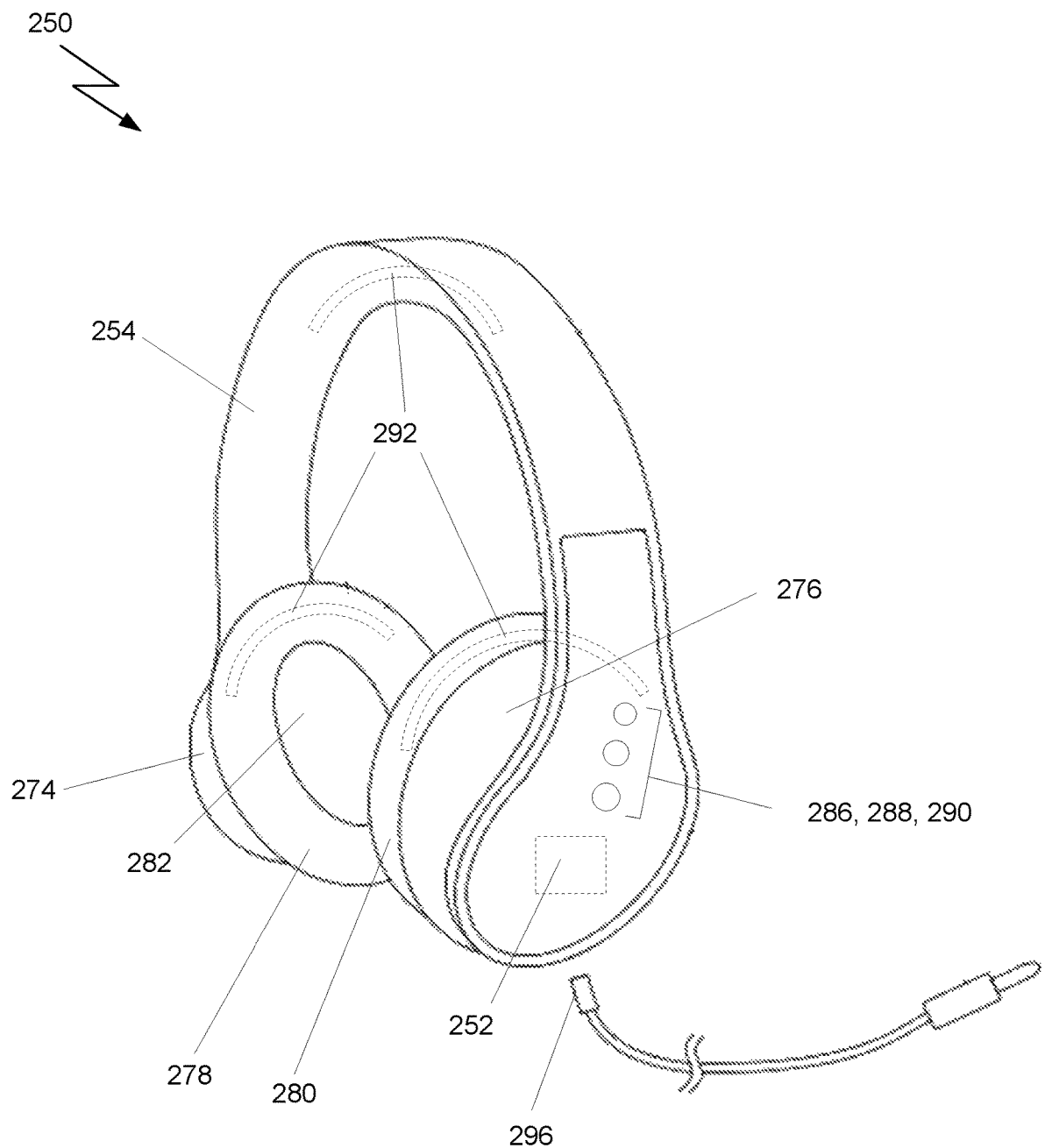

FIG. 2B illustrates a safety device 250 in a perspective view of an exemplary embodiment according to one or more aspects of the various embodiments. In some embodiments, safety device 200 is consistent with safety device 100 and/or safety device 200. As shown, safety device 250 is integrated into a headphone. Safety device 250 includes a head support portion 254. Earcups 274 and 276 are connected to respective ends of head support portion 254. Earcup 274 includes an ear cushion 278, and earcup 276 includes an ear cushion 280. Although not shown in FIG. 2B, the headphones may further include a microphone boom with one or more microphones.

Safety device 250 further includes a computing device 252, which may be consistent with computing device 102 and/or 202. FIG. 2B shows computing device 252 located inside earcup 276. However, computing device 252 may be located at any technically feasible location on safety device 250.

Safety device 250 further includes one or more speakers 282 located in each of earcup 274 and earcup 276. Each of speaker(s) 282 may be consistent with speaker(s) 132 and/or 232. In some embodiments, speaker(s) 282 may deliver directional audio or sound.

In some embodiments, safety device 250 may include indicator light(s) 286, input device(s) 288, and/or sensor(s) 290, each of which may be consistent with indicator light(s) 136 and/or 236, input device(s) 138 and/or 238, and sensor(s) 140 and/or 240, respectively. FIG. 2B shows indicator light(s) 286, input device(s) 288, and sensor(s) 290 positioned at earcup 276. However, indicator light(s) 286, input device(s) 288, and/or sensor(s) 290 may have other locations. For example, in some embodiments, indicator light(s) 286 may be located on the microphone boom extending towards the front of the head of the user when safety device 250 is worn and embodied as a headphone, or in any other configuration that allows the user to perceive output from indicator light(s) 286.

In some embodiments, safety device 250 may optionally include a location module (not shown) to determine a position and/or velocity of safety device 250 to provide to other devices (e.g., an AV) and/or to help determine an operating mode and/or context of safety device 250. In some embodiments, the location module is consistent with location module 144.

In some embodiments, safety device 250 may optionally be configured to be coupled or connected via a connector 296 to another device, such as a smartphone, portable media player, and/or the like. In some embodiments, connector 296, may be a USB cable, power cable, audio jack cable, networking cable, and/or the like. In some embodiments, safety device 250 may optionally and/or alternatively be coupled to another device wirelessly, such as via a Bluetooth connection.

Safety device 250 further includes haptic transducers 292, which may be consistent with haptic transducer(s) 142 and/or 242. Haptic transducers 292 provide alert information. Haptic transducers 292 may provide directional cues to the user (e.g., provide a direction of the position of an AV or, when a high risk of a collision is detected, a direction to move). For example, if there is a directional cue that indicates to the user to move to the left, the default setting might be continuous actuation or vibration of the haptic transducer 292 located in ear cushion 280 or around earcup 276 located at the left ear of the user. As another example, the directional cue may include motion, such as a haptic sensation that moves from a first location in ear cushion 278 or around earcup 274 for a first ear of the user to a second location in ear cushion 280 or around earcup 276 for a second ear of the user to provide a directional cue toward the direction of the second ear of the user.

Although FIG. 2B shows safety device 250 as a headphone, safety device 250 may instead be implemented or embodied in other electronic devices. Exemplary embodiments include headsets, earphones, earpieces, and/or earbuds. Further exemplary configurations include integration into other electronic devices such as smartphones, media players, smart glasses, augmented reality (AR) goggles, head-mounted display devices (HMDs), and/or the like.

Operating a Safety Device According to a Determined Context

Figure 3:
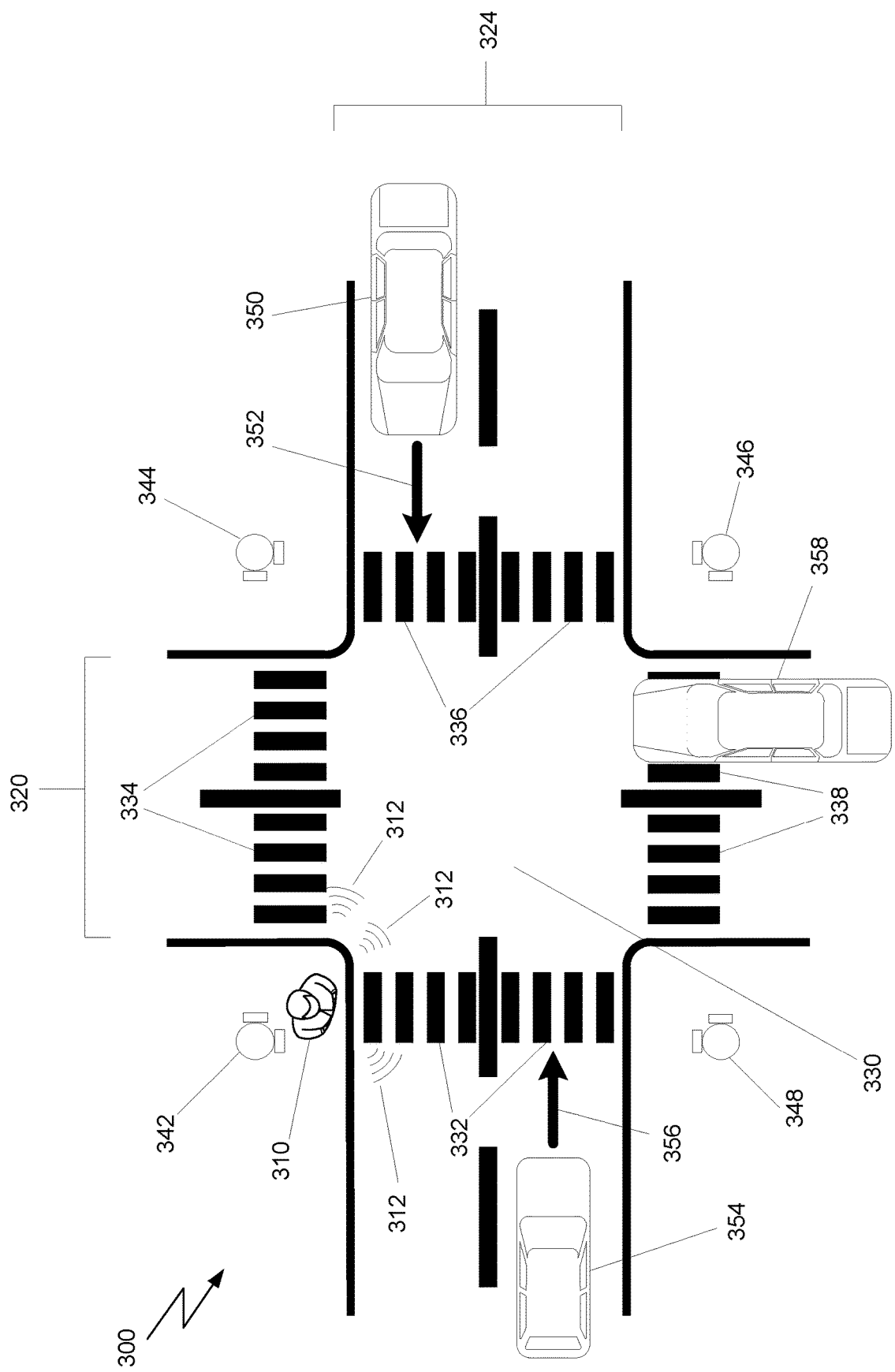
FIGS. 3 and 4 illustrate top views of different environments in which a safety device may be operated, according to one or more aspects of the various embodiments.

FIG. 3 shows an environment 300 in which a safety device may be operated, according to one or more aspects of the various embodiments. As shown in FIG. 3, environment 300 includes a user 310 equipped with a safety device consistent with safety device 100, 200, and/or 250 (referred to in general as safety device 100). Environment 300 includes a road 320 and a road 324 forming an intersection 330. Although shown with a general horizontal and vertical configuration, respectively, in FIG. 3, road 320 and road 324 may have other orientations than those shown. Intersection 330 includes crosswalks 332 and 334 for crossing road 320 on respective sides of road 324 and crosswalks 336 and 338 for crossing road 324 on respective sides of road 320. As shown, user 310 is located near the upper-left corner of intersection 330 and is facing toward crosswalk 332 as if about to cross road 324. Each of the four corners of intersection 330 includes a respective crossing light 342, 344, 346, and 348 for providing signals and/or indicators to pedestrians, etc. as to when it is appropriate to use crosswalks 332, 334, 336, and/or 338 to cross road 320 and/or road 324. Intersection 330 may further have traffic lights (not shown) for controlling traffic on roads 320 and 324. Environment 300 further includes an AV 350 on road 324 to the right of crosswalk 336, with a velocity (direction and speed) represented by an arrow 352. Environment 300 also has an AV 354 on road 324 to the left of crosswalk 332, with a velocity 356 (direction and speed) represented by an arrow. AV 358 is on road 320, both below and facing towards intersection 330, stopped on top of crosswalk 338.

As previously discussed, safety device 100 includes safety and alert application 120 that determines a context of safety device 100 (e.g., receives and/or determines movement of user 310 or safety device 100, positions of safety device 100, weather conditions, traffic conditions, user input, and/or the like), configures an alert based on the context, and broadcasts the configured alert via wireless transceiver 108. In some embodiments, safety and alert application 120 may also determine a position of safety device using location module 144, and may further configure the alert based on the position and/or to include the position of safety device 100 in one or more modes based on the context of safety device 100.

In some embodiments, safety and alert application 120 may operate safety device 100 in a basic alert mode. In some examples, safety and alert application 120 may switch safety device 100 to the basic alert mode in response to user 310 turning safety device 100 on and/or selecting the basic alert mode. In some examples, user 310 may select the basic alert mode by pressing one or more buttons of input device(s) 138, tapping a display 134, issuing an audio command captured by a microphone of input device(s) 138, performing a gesture (e.g., making a specific type of wrist shake), and/or the like. In some examples, safety and alert application 120 may automatically switch safety device 100 to the basic alert mode, such as by detecting that safety device 100 is being worn, detecting that user 310 with safety device 100 exits a building and/or a vehicle, detecting that safety device 100 is within a predetermined distance of a roadway or other position where an AV may be operating (e.g., a parking lot) using the location information from location module 144. For example, safety and safety device 100 can automatically switch safety device 100 to the basic alert mode when safety device 100 is within the predetermined distance of road 320 and/or road 324.

Safety and alert application 120 may indicate to user 310 that safety device 100 is in the basic alert mode through one or more of sounds, text and/or graphic display, light, haptic effect, and/or the like using one or more of speaker(s) 132, display(s) 134, indicator light(s) 136, haptic transducer(s) 142, and/or like. For example, safety and alert application 120 can cause speakers 132 to beep or to provide an audio notification to indicate that safety device 100 is in the basic alert mode. As another example, safety and alert application 120 can cause display(s) 134 to display a text and/or graphic message to indicate that safety device 100 is in the basic alert mode. As another example, safety and alert application 120 can cause indicator light(s) 136 to turn on with a particular color, pattern, or design to indicate that safety device 100 is in the basic alert mode. As another example, safety and alert application 120 can cause haptic transducer(s) 142 to generate a haptic sensation or effect to indicate that safety device 100 is in the basic alert mode.

In the basic alert mode, safety and alert application 120 configures a basic alert to be broadcast to nearby AVs. Safety and alert application 120 may configure one or more of a power level, a frequency range, a communication channel, a broadcasting interval, a priority, and/or the like for the basic alert that is to be broadcast. In some examples, safety and alert application 120 may include an identifier assigned to safety device 100 in the basic alert. In some examples, safety and alert application 120 may include the position of safety device 100 in the basic alert. Alternatively, an AV receiving the broadcast basic alert may determine the position of safety device 100 based on one or more of signal strength, signal directional information, and/or the like of the broadcast basic alert. In some examples, the basic alert may be configured to include a request to a receiving AV to acknowledge receipt of the basic alert.

Once the basic alert is configured, safety and alert application 120 broadcasts the basic alert, as shown by signals 312, using wireless transceiver 108 according to the configured power level, frequency range, communication channel, and/or the like. Safety and alert application 120 may then repeat the broadcast of the basic alert based on the configured broadcast interval. For example, the basic alert can be broadcast to one or more nearby AVs, such as AVs 350, 354, and 358. In some examples, safety and alert application 120 may provide feedback to user 310 indicating which nearby AVs have acknowledged receipt of the basic alert.

In some embodiments, safety and alert application 120 may operate safety device 100 in an enhanced alert mode. For example, user 310 might be concerned about the proximity of user 310 to a roadway, the presence of heavy traffic, and/or the speed, direction, and/or proximity of one or more vehicles or AVs. In response, user 310 may switch safety device 100 to the enhanced alert mode. In some examples, user 310 may select to switch safety device 100 to the enhanced alert mode by pressing one or more buttons of input device(s) 138, tapping a display 134, issuing an audio command captured by a microphone of input device(s) 138, performing a gesture, and/or the like. In some examples, safety and alert application 120 may automatically switch safety device 100 to the enhanced alert mode, such as by detecting that safety device 100 is within a predetermined distance (e.g., a shorter predetermined distance than the predetermined distance for the basic alert mode) of a roadway or other location in which an AV may be operating and/or a direction of motion of safety device 100 indicates that safety device 100 is approaching or about to enter the roadway or other location in which an AV may be operating. For example, safety and alert application 120 can switch safety device 100 to the enhanced alert mode when safety device 100 is within the predetermined distance or is approaching road 320, road 324, intersection 330, and/or any of crossing lights 342, 344, 346, and/or 348. In some examples, safety and alert application 120 may switch safety device 100 to the enhanced alert mode when travel information from a navigation application (e.g., from a personal or pedestrian navigation system) provides a navigation instruction to the user to enter or cross a road. In some examples, safety and alert application 120 may switch safety device 100 to the enhanced alert mode when motion of safety device 100 indicates that the movement of user 310 may be less predictable, such as when safety device 100 is moving faster than a predetermined speed, when there are frequent changes in the direction of motion of safety device 100, and/or the like. In some examples, safety and alert application may determine that the movement of user 310 may be less predictable when user 310 is distracted, such as by detecting that user 310 is looking at a smartphone, reading material, a smart watch, and/or the like, detecting that user 310 is involved in a conversation with a companion or on a phone, and/or the like.

Safety and alert application 120 may indicate to user 310 that safety device 100 is in the enhanced alert mode through one or more of sounds, text and/or graphic display, light, haptic effect, and/or the like using one or more of speaker(s) 132, display(s) 134, indicator light(s) 136, haptic transducer(s) 142, and/or like. For example, safety and alert application 120 can cause speakers 132 to beep or to provide an audio notification to indicate that safety device 100 is in the enhanced alert mode. As another example, safety and alert application 120 can cause display(s) 134 to display a text and/or graphic message to indicate that safety device 100 is in the enhanced alert mode. Safety and alert application 120 can cause indicator light(s) 136 to turn on with a particular color, pattern, or design to indicate that safety device 100 is in the enhanced alert mode. Safety and alert application 120 can cause haptic transducer(s) 142 to generate a haptic sensation or effect to indicate that safety device 100 is in the enhanced alert mode.

In the enhanced alert mode, safety and alert application 120 configures an enhanced alert to be broadcast to nearby AVs. Safety and alert application 120 may configure the enhanced alert similar to the basic alert, but may configure the enhanced alert to be broadcast with one or more of a higher power, a wider frequency range, using more channels, a higher priority, and/or with a shorter broadcast interval. In some examples, safety and alert application 120 may also configure the enhanced safety alert to include an indicator that the motion of safety device 100 is less predictable when such a detection has been made. For example, the enhanced alert can be configured with a flag to indicate that the motion of safety device 100 and/or user 310 is less predictable. In some examples, safety and alert application 120 may include the position of safety device 100 in the enhanced alert. Alternatively, an AV receiving the broadcast enhanced alert may determine the position of safety device 100 based on one or more of signal strength, signal directional information, and/or the like of the broadcast enhanced alert. In some examples, the enhanced alert may be configured to include a request to a receiving AV to acknowledge receipt of the enhanced alert.

Once the enhanced alert is configured, safety and alert application 120 broadcasts the enhanced alert, as shown by signals 312, using wireless transceiver 108 according to the configured power level, frequency, communication channel, priority, and/or the like. Safety and alert application 120 may then repeat the broadcast of the enhanced alert based on the configured broadcast interval. For example, the enhanced alert may be broadcast to one or more nearby AVs, such as AVs 350, 354, and 358. In some examples, safety and alert application 120 may provide feedback to user 310 indicating which nearby AVs have acknowledged receipt of the enhanced alert.

In some embodiments, safety and alert application 120 may switch safety device 100 back to the basic alert mode based on user input and/or when the context of safety device 100 indicates that the enhanced alert mode is no longer appropriate. In some examples, safety and alert application 120 may automatically switch safety device 100 back to the basic alert mode in response to detecting one or more of safety device 100 moving more than the predetermined distance from a roadway, a position and/or velocity of safety device 100 are away from a roadway, a navigation instruction from the navigation application directs user 310 away from the roadway, the motion of user 310 has become more predictable, and/or the like.

Figure 4:
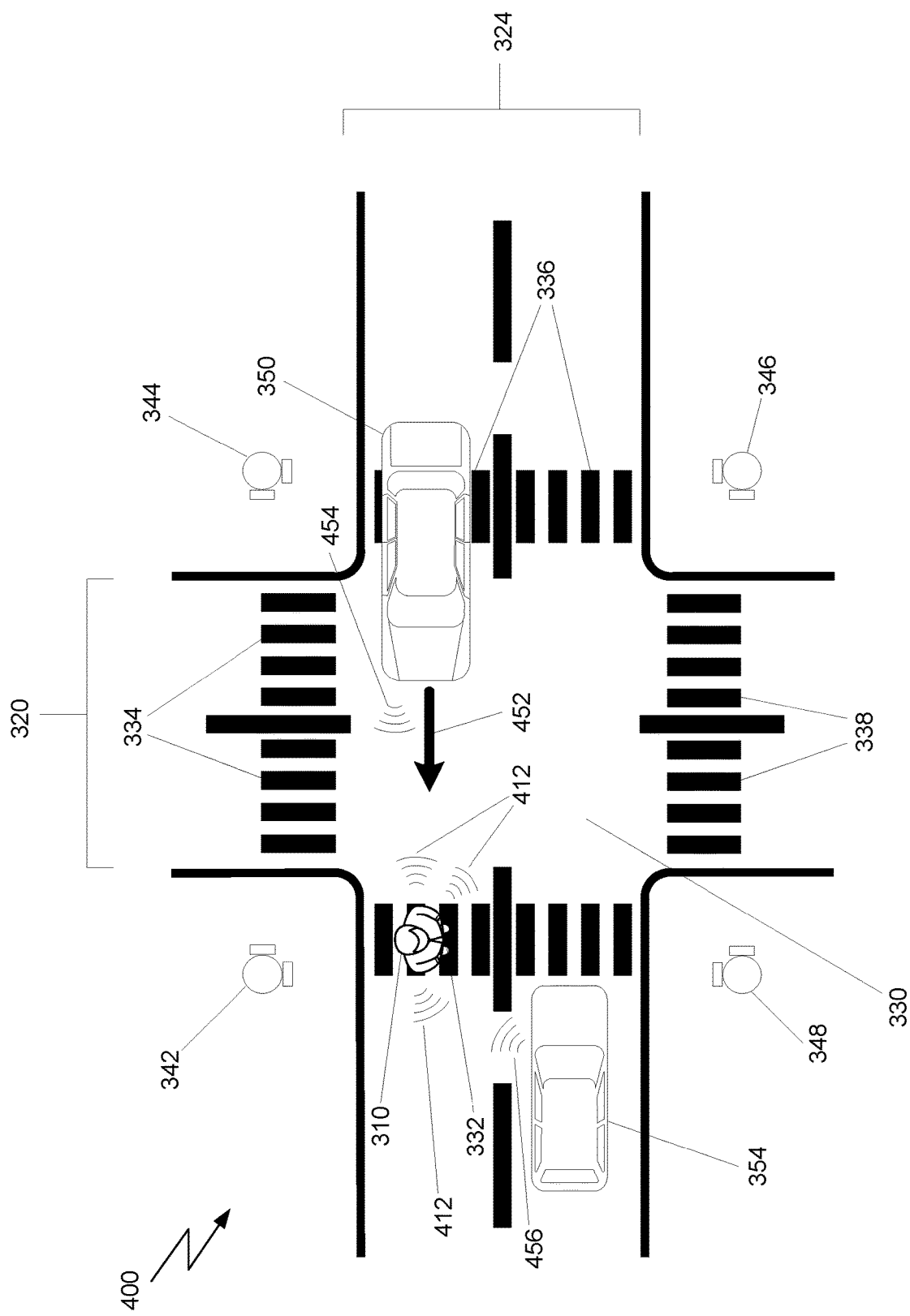

FIG. 4 shows an environment 400 in which a safety device may be operated, according to one or more aspects of the various embodiments. As shown in FIG. 4, environment 400, is similar to environment 300 of FIG. 3 except that user 310 is crossing road 324 in crosswalk 332, AV 350 has entered intersection 330 and is approaching user 310 with velocity 452, AV 354 is stopped before crosswalk 332, and AV 358 has left the immediate vicinity of intersection 330.

In some embodiments, safety and alert application 120 may operate safety device 100 in a high alert mode. For example, user 310 might be concerned about or perceive the need for additional safety beyond that of enhanced alert mode, such as due increased concerns of an AV colliding with user 310. In response, user 310 may switch safety device 100 to the high alert mode. In some examples, user 310 may select to switch safety device 100 to the high alert mode by pressing one or more buttons of input device(s) 138, tapping a display 134, issuing an audio command captured by a microphone of input device(s) 138, performing a gesture, and/or the like. In some examples, safety and alert application 120 may automatically switch safety device 100 to the high alert mode, such as by detecting that safety device 100 is within a roadway or other location in which an AV may be operating and/or a direction of motion of safety device 100 indicates that safety device 100 is entering the roadway or other location in which an AV may be operating For example, safety and alert application 120 can automatically switch safety device 100 to the high alert mode when safety device 100 is within road 320, road 324, intersection 330, and/or any of crosswalks 332, 334, 336, and/or 338, such as is shown in FIG. 4, where user is crossing road 324 in crosswalk 332. In some examples, safety and alert application 120 may switch safety device 100 to the high alert mode when travel information from a navigation application tracks the user as being located within a roadway or provides a navigation instruction to the user to enter a roadway.

Safety and alert application 120 may indicate to user 310 that safety device 100 is in the high alert mode through one or more of sounds, text and/or graphic display, light, haptic effect, and/or the like using one or more of speaker(s) 132, display(s) 134, indicator light(s) 136, haptic transducer(s) 142, and/or like. For example, safety and alert application 120 can cause speakers 132 to beep or to provide an audio notification to indicate that safety device 100 is in the high alert mode. As another example, safety and alert application 120 can cause display(s) 134 to display a text and/or graphic message to indicate that safety device 100 is in the high alert mode. Safety and alert application 120 can cause indicator light(s) 136 to turn on with a particular color, pattern, or design to indicate that safety device 100 is in the high alert mode. Safety and alert application 120 can cause haptic transducer(s) 142 to generate a haptic sensation or effect to indicate that safety device 100 is in the high alert mode.

In the high alert mode, safety and alert application 120 determines a position and/or a velocity of safety device 100. Safety and alert application 120 may determine the position and/or the velocity using any technically feasible technique, such as by using location module 144 and/or using sensor(s) 140 to determine the position and/or velocity relative to other safety devices, AVs, traffic control systems, and/or the like.

In the high alert mode, safety and alert application 120 can broadcast a high alert. Safety and alert application 120 may configure the high alert similar to the basic alert and/or the enhanced alert, but may configure the high alert to be broadcast with one or more of a higher power, a wider frequency range, using more channels, a higher priority, and/or with a shorter broadcast interval than a basic and/or enhanced alert. In addition, the high alert may include the position and/or the velocity of the safety device 100. Further, the high alert may contain a request to each of the receiving AVs to return their respective positions, velocities, accelerations, and/or paths. In some examples, the high alert may further include an identifier assigned to safety device 100 and/or network identifying information to facilitate return of a response to safety device 100 by each receiving AV. For example, safety and alert application 120 can broadcast the high alert to AVs 350 and 351 using wireless transceiver 108 as shown by signals 412.

In the high alert mode, safety and alert application 120 may receive a response from one or more nearby AVs via wireless transceiver 108 as shown by signals 454 and 456. The response may include the positions, velocities, accelerations, and/or paths of the one or more AVs. In some examples, each of the responses may include a unique identifier or other network identifying information used by the responding AV to identify and distinguish between the responses from different AVs and/or to facilitate further communications with the responding AVs.

In some examples, in the high alert mode, safety and alert application 120 may optionally display the position, velocity, and/or other information of each of the responding AVs to user 310. For example, safety and alert application 120 can display a map on display(s) 134. The map can show the position of user 310 using an icon or other marker, such as at a center of the map. The map can additionally show the positions of the responding AVs using different icons and/or markers and/or the velocities, and/or paths of each of the responding AVs using one or more arrows or lines. In some examples, each of the AVs may be displayed with a different color and/or a color based on their respective proximity to safety device 100 and/or their respective velocities relative to safety device 100. For example, safety and alert application 120 can show the position of safety device 100 as a green dot and positions and velocities and/or paths of the responding AVs in blue. Greater attention may be drawn to AV 350, which is approaching user 310, by changing a color of AV 350 to yellow to indicate greater concern or even a blinking red when there is a high risk of a collision with AV 350.

In the high alert mode, safety and alert application 120 determines whether there is a high risk of a collision between an AV and the user based on the positions, and/or velocities of safety device 100 and the positions, velocities, accelerations, and/or paths of each of the responding AVs. Safety and alert application 120 may use any technically feasible approach to determine whether there is a high risk of a collision with user 310 and one or more of the responding AVs. For example, safety and alert application 120 can determine a projected future position of safety device 100 based on the position and velocity of safety device 100. Safety and alert application 120 can additionally determine a projected future position of each of the responding AVs to determine whether the projected future position of any of the responding AVs is likely to coincide with or approaches within a predetermined distance of the projected future position of safety device 100. For example, in FIG. 4, safety device 100, and user 310, are in the immediate travel direction of AV 350. Safety and alert application 120 determines that combination of the position and velocity of safety device 100 and the position and velocity 452 of AV 350 indicate that there is a high risk of a collision between AV 350 and user 310. Optionally, safety and alert application 120 may determine a direction in which user 310 can move to best avoid the projected collision based on the position and velocity information of safety device 100, of AV 350 and/or of any other AVs in the vicinity (if any). When safety and alert application 120 determines that there is not a high risk of collision with an AV, safety and alert application 120 repeats the process of collision risk detection by again determining the position and/or velocity of safety device 100 and any nearby AVs, as explained above.

When safety and alert application 120 determines that there is a high risk of a collision with an AV, safety and alert application 120, in the high alert mode, can indicate to user 310 that there is a high risk of collision through one or more of sounds, text and/or graphic display, light, haptic effect, and/or the like using one or more of speaker(s) 132, display(s) 134, indicator light(s) 136, haptic transducer(s) 142, and/or like. For example, safety and alert application 120 can cause speakers 132 to beep or to provide an audio notification to indicate to user 310 that there is a high risk of a collision with an AV. As another example, safety and alert application 120 can cause display(s) 134 to display a text and/or graphic message to indicate to user 310 that there is a high risk of collision. Safety and alert application 120 can cause indicator light(s) 136 to turn on with a particular color, pattern, or design to indicate to user 310 that there is a high risk of collision. Safety and alert application 120 can cause haptic transducer(s) 142 to cause a haptic sensation or effect to indicate to user 310 that there is a high risk of collision. In some examples, safety and alert application 120 may use the position and velocity information of safety device 100 and/or the responding AVs to warn user 310 of the specific direction of the projected collision. For example, safety and alert application 120 can cause speaker(s) 132 to notify user 310 of the direction by which AV 350 is approaching and/or the direction to move to that best reduces the likelihood of collision with AV 350. Safety and alert application 120 can cause display(s) 134 to visually show user 310 of the direction by which an AV is approaching and/or the direction to move to that best reduces the likelihood of collision. Safety and alert application 120 can cause haptic transducer(s) 142 to generate a haptic sensation or effect to provide one or more directional cues to convey to user 310 the direction by which an AV is approaching and/or the direction to move to that best reduces the likelihood of collision.

Safety and alert application 120 further sends a collision risk alert to the AV with the high risk of collision with user 310 (e.g., AV 350) using wireless transceiver 108. In some examples, the collision risk alert may include the position and/or velocity of safety device 100 and/or the projected time and position of the collision. In some examples, the collision risk alert may include a request to the AV for emergency action (e.g., to slow down, stop, and/or change direction). Optionally, the request in the collision risk alert may include a request for the AV to emit a sound (e.g., honk a horn), flash a light (e.g., directed toward user 310), and/or the like. In some embodiments, the collision risk alert may also be sent to and/or received by other nearby AVs to warn them of the possibility of the collision and/or an evasive maneuver by the AV with the high risk of collision with user 310.

After sending the collision risk alert to AV 350, safety and alert application 120 uses wireless transceiver 108 to look for an acknowledgment from AV 350 to confirm that AV 350 has received the collision risk alert. When an acknowledgment is not received from AV 350 in a predetermined period of time, safety and alert application 120 repeats the collision risk alert according to the configured power level, frequency range, communication channel, priority, and/or the like until an acknowledgment is received. In some examples, safety and alert application 120 may further increase one or more of power level, frequency range, number of communication channels, the priority level and/or the like when the collision risk alert is repeated. Once an acknowledgment of the collision risk alert is received from AV 350, safety and alert application 120 repeats the process of determining new positions and velocities to determine whether the high risk of collision has been averted or other collisions are likely.

In some embodiments, safety and alert application 120 may switch safety device 100 back to the basic alert mode and/or the enhanced alert mode based on user input and/or when the context of safety device 100 indicates that the enhanced alert mode is no longer appropriate. In some examples, safety and alert application 120 may automatically switch safety device 100 back to the basic alert mode in response to detecting that safety device 100 is no longer in the roadway and/or in an area where AVs are likely to be operating.

In some embodiments, safety and alert application 120 may operate safety device 100 in a user request mode where, in addition to broadcasting basic, enhanced, or high alerts, safety device 100 may transmit additional alerts and/or requests upon user request. Like the user actions to select the basic, enhanced, and/or high alert modes, user 310 can select to transmit additional alerts and/or requests by pressing one or more buttons of input device(s) 138, tapping a display 134, issuing an audio command captured by a microphone of input device(s) 138, performing a gesture, and/or the like. In some examples, the additional alerts and/or requests may be transmitted using wireless transceiver 108 to one or more AVs, a traffic control system, and/or the like. In some examples, user 310 may select to have safety and alert application 120 and safety device 100 transmit a request to one or more AVs to have the AVs emit a sound (e.g., honk a horn), flash a light, slow down, stop, return a position of the AV, and/or the like. For example, user 310 can use safety device 100 to send a slowdown request to one or more AVs 350, 354, and/or 358 when user 310 nears intersection 330. As another example, user 310 can use safety device 100 to send a request to one or more of AVs 350, 354, and/or 358 to provide their position and/or their velocity (e.g., as indicated by arrows 352 and/or 356). In some examples, the request may include an additional request to have each AV respond with an acknowledgment to confirm that the request or a broadcast alert has been received by the corresponding AV. In some examples, safety and alert application 120 may communicate receipt of an acknowledgment through one or more of sounds, text and/or graphic display, light, haptic effect, and/or the like using one or more of speaker(s) 132, display(s) 134, indicator light(s) 136, haptic transducer(s) 142, and/or like.

As another example, user 310 can select to have safety and alert application 120 and safety device 100 transmit a request to a traffic control system to aid user 310 in the crossing of road 320 and/or 324. In some examples, the request may include position and/or direction information for user 310 and/or safety device 100 to indicate a direction in which user 310 would like to cross. The direction in which user 310 would like to cross may be determined based on a direction of motion of safety device 100, a direction user 310 is facing, a navigation instruction from the navigation application, and/or the like. In some examples, the traffic control system may provide a response acknowledging the request and/or an indication when it is safe to cross. In some examples, safety and alert application 120 may convey receipt of the response to user 310 through one or more of sounds, text and/or graphic display, light, haptic effect, and/or the like using one or more of speaker(s) 132, display(s) 134, indicator light(s) 136, haptic transducer(s) 142, and/or like.

Operating Methods of a Context-Aware Safety Device

Figure 5:
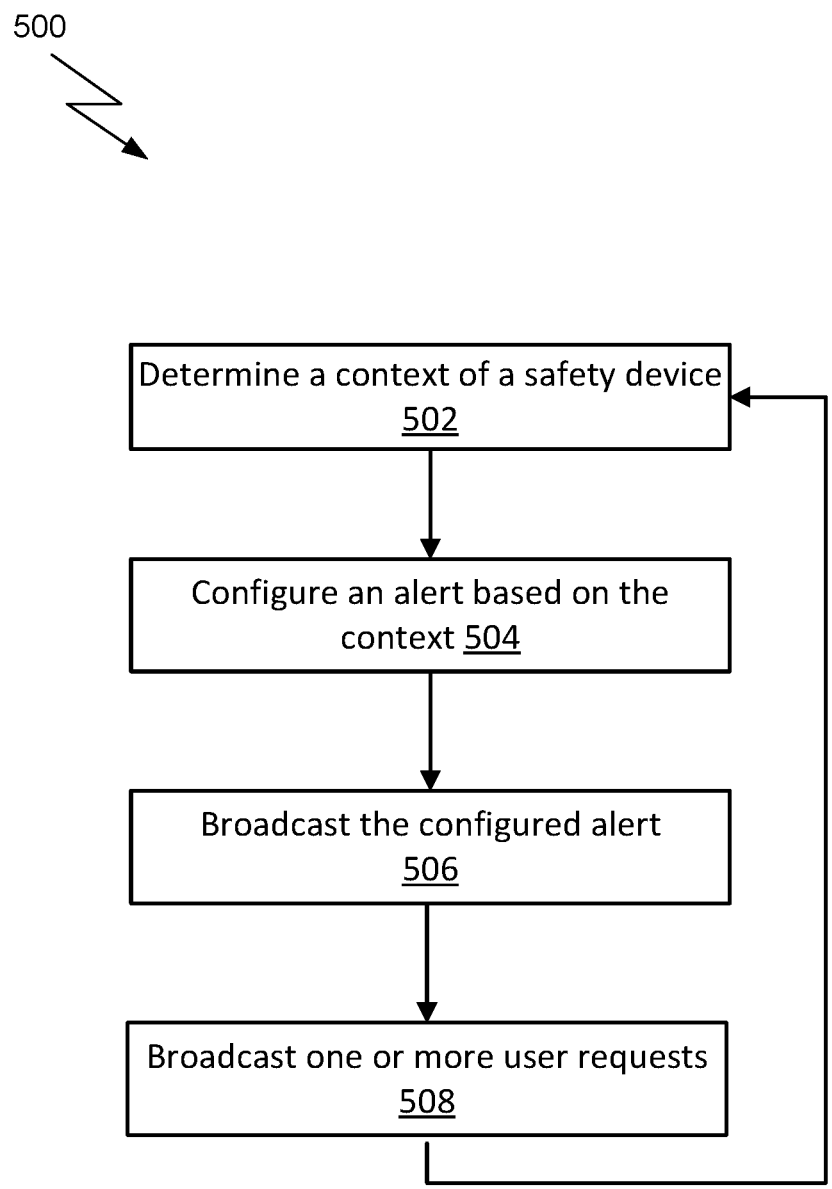
FIG. 5 illustrates a flow diagram of method steps for operating a context-aware safety device, according to one or more aspects of the various embodiments.

FIG. 5 illustrates a flow diagram of method steps for operating a context-aware safety device, according to one or more aspects of the various embodiments. Although the method steps are described in conjunction with the systems of FIGS. 1-4, persons skilled in the art will understand that any system configured to perform the method steps, in any order, falls within the scope of the various embodiments.

A method 500 begins at step 502, where safety and alert application 120 determines a context of a safety device consistent with safety device 100, 200, and/or 250 (referred to in general as safety device 100). Safety and alert application may determine the context of safety device based on one or more of user input (e.g., user 310 selecting a specific mode of operation for safety device 100), whether safety device is being worn, a position and/or a velocity of safety device 100, travel information received from a navigation application, whether user 310 is exhibiting unpredictable and/or distracted behavior, and/or the like. Based on the determined context, safety and alert application 120 may switch safety device 100 to any one of the basic alert, enhanced alert, high alert, and/or user request modes as previously described. In some examples, safety and alert application 120 may further provide one or more indicators to user 310 indicating the context and/or the current mode of safety device 100, such as by using one or more of speaker(s) 132, display(s) 134 indicator light(s) 136, haptic transducer(s) 142, and/or the like.

At step 504, safety and alert application 120 configures an alert based on the context determined during step 502. Safety and alert application 120 may configure one or more of a power level, a frequency range, communication channel(s) to use, a broadcasting interval, a priority, and/or the like. In some examples, safety and alert application 120 may configure the alert as any one of the basic, enhanced, and/or high alert based on the mode of safety device 100 determined during step 502. In some examples, safety and alert application 120 may include one or more of an identifier assigned to safety device 100, a position of safety device 100, other context information (e.g., an indication of whether movement of safety device 100 is less predictable and/or a user of safety device 100 is distracted), and/or the like. In some examples, the alert may include a request for a receiving AV or other device to acknowledge receipt of the alert.

At step 506, safety and alert application 120 broadcasts the configured alert using wireless transceiver 108. The alert may be broadcast according to one or more of the configured power level, frequency range, communication channel(s), priority, and/or the like determined during step 504. Safety and alert application 120 may then repeat the broadcast of the alert at the configured broadcast interval. In some examples, when the alert includes a request for an AV to acknowledge receipt of the alert, safety and alert application 120 may increase the power level, widen the frequency range, use more communication channels, increase a priority, and/or the like in repeated broadcasts of the alert. In some examples, safety and alert application 120 may further increase the power level, widen the frequency range, use more communication channels, increase a priority, and/or the like with each repetition of the broadcast of the alert that is not acknowledged.

At step 508, safety and alert application 120 broadcasts one or more user requests using wireless transceiver 108. In some examples, a user request may include a request to one or more AVs to slow down, stop, emit a sound (e.g., honk a horn), flash a light, provide location information, and/or the like. In some examples, a user request may be made to a traffic control system to, for example, request activation of a crossing light to allow the user to cross a road.

Method 500 is then repeated to continually update the behavior of safety device 100 as context and/or user requests change.

Figure 6:
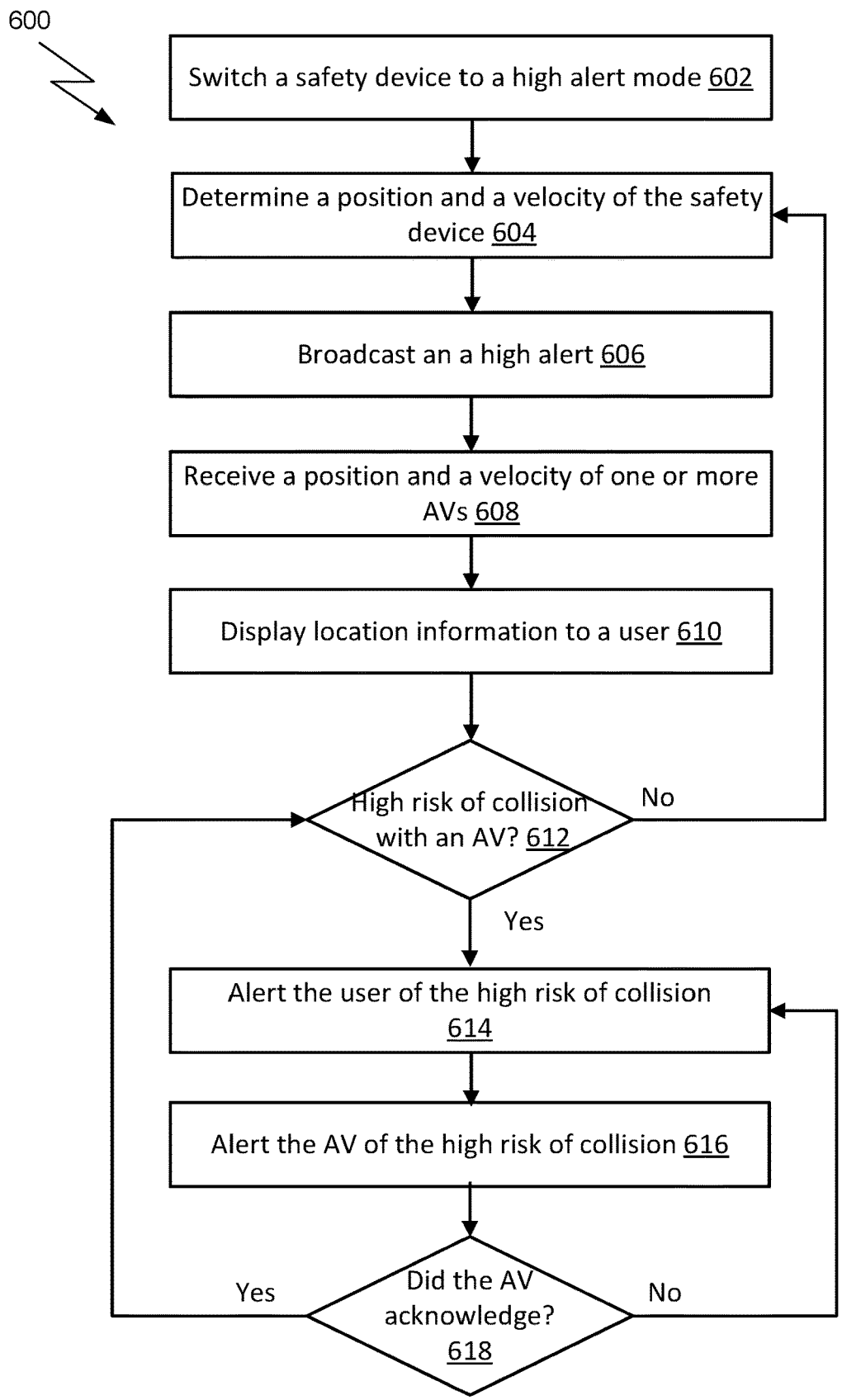
FIG. 6 illustrates another flow diagram of method steps for operating a context-aware safety device, according to one or more aspects of the various embodiments.

FIG. 6 illustrates another flow diagram of method steps for operating a context-aware safety device, according to one or more aspects of the various embodiments. Although the method steps are described in conjunction with the systems of FIGS. 1-5, persons skilled in the art will understand that any system configured to perform the method steps, in any order, falls within the scope of the various embodiments.

A method 600 begins at step 602, where safety and alert application 120 switches safety device 100 to a high alert mode. In some examples, safety and alert application 120 switches safety device 100 to the high alert mode based on a context of safety device 100, such as one or more of user input (e.g., user 310 selecting high alert mode of operation for safety device 100), whether a position and/or a velocity of safety device 100 and/or travel information received from a navigation application indicate whether a user of safety device 100 is in a roadway and/or other area where an AV is likely to be operated, and/or the like. In some examples, safety and alert application 120 may switch safety device 100 to the high alert mode based on the context detection of step 502. In some examples, safety and alert application 120 may further provide one or more indicators to user 310 indicating that safety device 100 is in the high alert mode, such as by using one or more of speaker(s) 132, display(s) 134 indicator light(s) 136, haptic transducer(s) 142, and/or the like.

At step 604, safety and alert application 120 determines a position and a velocity of safety device 100. Safety and alert application may determine the position and/or the velocity using any technically feasible technique, such as by using location module 144 and/or using sensor(s) 140 to determine the position and/or velocity relative to other safety devices, AVs, traffic control systems, and/or the like.

At step 606, safety and alert application broadcasts a high alert using wireless transceiver 108. The high alert includes the position of safety device 100 and a request that receiving AVs return their respective positions and velocities to safety device 100. Alternatively, the receiving AVs may be requested to provide their respective positions and paths and/or optionally their respective accelerations. In some examples, the high alert may further include an identifier assigned to safety device 100 and/or network identifying information to facilitate return of a response to safety device 100 by each receiving AV. The high alert may be broadcast using one or more of a power level, a frequency range, communication channel(s) to use, a broadcasting interval, a priority, and/or the like suitable for high alert mode.

At a step 608, safety and alert application 120 receives a position and a velocity from a responding AV. Alternatively, safety and alert application 120 may receive a position and a path from the responding AV. In some examples, the response may include a unique identifier or other network identifying information used by the responding AV to identify and distinguish between the responses from different AVs and/or to facilitate further communications with the responding AV.

At an optional step 610, safety and alert application 120 displays location information to the user of safety device 100. For example, safety and alert application 120 can display a map on display(s) 134. The map can show the position of the user/safety device 100 using an icon or other marker, such as at a center of the map. The map can additionally show the position of the responding AV using a different icon and/or marker and/or the velocity, and/or the path of the responding AV using one or more arrows or lines. In some examples, the responding AV may be displayed with unique color assigned to the responding AV and/or a color based on the proximity to safety device 100 to the responding AV and/or a velocity of the responding AV relative to safety device 100. For example, safety and alert application 120 can show the position of safety device 100 as a green dot and a position and velocity, and/or path of the responding AV in blue, with the color changing to yellow to indicate greater concern for the responding AV or even a blinking red when there is a high risk of a collision with the responding AV.

At step 612, safety and alert application 120 determines whether there is a high risk of a collision between the user of safety device 100 and the responding AV. Safety and alert application 120 may use any technically feasible approach to determine whether there is a high risk of a collision with the user and the responding AV. In some examples, safety and alert application 120 may determine a projected future position of safety device 100 based on the position and velocity of safety device 100 determined during step 604. Safety and alert application 120 may additionally determine a projected future position of the responding AV to determine whether the projected future position of the responding AV is likely to coincide with or approach within a predetermined distance of the projected future position of safety device 100 Optionally, safety and alert application 120 may determine a direction in which the user 310 can move to best avoid the collision based on the position and velocity information of safety device 100 and the responding AV. When safety and alert application 120 determines that there is not a high risk of collision with the responding AV, safety and alert application 120 repeats the process of collision risk detection by returning to step 604. When safety and alert application 120 determines there is a high risk of collision with the responding AV, the user of safety device 100 and the responding AV may receive additional alerts beginning with step 614.

At step 614, safety and alert application 120 alerts the user of the high risk of collision. Safety and alert application 120 may alert the user using one or more of sounds, text and/or graphic display, light, haptic effect, and/or the like using one or more of speaker(s) 132, display(s) 134, indicator light(s) 136, haptic transducer(s) 142, and/or like. In some examples, safety and alert application 120 may use the position and velocity information of safety device 100 and/or the responding AV to warn the user of the specific direction of the projected collision. For example, safety and alert application 120 can cause speaker(s) 132 to notify user 310 of the direction by which the responding AV is approaching and/or the direction to move to that best reduces the likelihood of collision with the responding AV. Safety and alert application 120 can cause display(s) 134 to visually show the user of the direction by which the responding AV is approaching and/or the direction to move to that best reduces the likelihood of collision. Safety and alert application 120 can cause haptic transducer(s) 142 to generate a haptic sensation or effect to provide one or more directional cues to convey to the user the direction by which the responding AV is approaching and/or the direction to move to that best reduces the likelihood of collision.

At step 616, safety and alert application 120 alerts the responding AV of the high risk of collision with the user using wireless transceiver 108. In some examples, safety and alert application 120 may send a collision risk alert to the responding AV. In some examples, the collision risk alert may include the position and/or velocity of safety device 100 and/or the projected time and position of the collision. In some examples, the collision risk alert may include a request to the AV for emergency action (e.g., to slow down, stop, and/or change direction). Optionally, the request in the collision risk alert may include a request for the AV to emit a sound (e.g., honk a horn), flash a light, and/or the like.

At step 618, safety and alert application 120 uses wireless transceiver 108 to determine whether the responding AV has sent an acknowledgment to the alert sent during step 616. When an acknowledgment is not received from the responding AV in a predetermined period of time, safety and alert application 120 repeats the alerts of steps 614 and 616. In some examples, safety and alert application 120 may further increase one or more of power level, frequency range, number of communication channels, the priority level and/or the like when repeating the alert sent to the responding AV during step 616. Once an acknowledgment of the alert sent during step 616 is received, safety and alert application 120 repeats the process of determining new positions and velocities to determine whether the high risk of collision has been averted or other collisions are likely by returning to step 612 or alternatively to step 604.

Although not expressly shown in FIG. 6, each of steps 608-618 may be repeated (e.g., in parallel) for each nearby AV that responds to the high alert broadcast during step 606. In some examples, safety and alert application 120 may concurrently display the location information for each of the responding AVs using step 610. In some examples, safety and alert application 120 may concurrently determine which of the responding AVs show a high risk of a collision and provide corresponding collision risk alerts to the user and the respective AV to avoid the collision.

In addition to the various embodiments already described, safety device 100 and/or safety and alert application 120 may be used to implement other safety and/or convenience features for a user. In some embodiments, safety device 100 and/or safety and alert application 120 may support additional alerting features than those described above with respect to steps 614 and/or 616. In some examples, safety and alert application 120 may log event and/or operational data into the memory of a "black box", in case an accident really happens. In some examples, the "black box" may be located in safety device 100 and/or located in a remote server in case safety device 100 is damaged or destroyed in an accident. In some examples, safety and alert application 120 may send one or more alerts to police and/or first responders as a pre-warning of the possible collision. In some examples, safety and alert application 120 may additionally cancel the one or more alerts when the possible collision is avoided.

In some embodiments, safety device 100 and/or safety and alert application 120 may be configured to work with crowd control and/or surveillance systems. In some examples, safety and alert application may share the position of safety device 100 with the crowd control and/or surveillance system to facilitate tracking of safety device and the user and/or to provide the user with instructions as to when and/or how to leave a crowded and/or dangerous area. In some examples, safety and alert application 120 may communicate with other safety devices, such as to alert two distracted or less predictable users before they run into each other.

In some embodiments, safety device 100 and/or safety and alert application 120 may be used with non-AV vehicular applications. In some examples, safety and alert application 120 can broadcast the position of safety device 100 to non-AV vehicles and/or vehicle-related systems. In some examples, the position of safety device 100 may be received by an AV, a non-AV, and/or other interface system and displayed to a driver on a console display, a navigational map, a heads-up display, an augmented reality system, and/or the like to notify the driver of the position of safety device 100 and the corresponding user. In some examples, the position information may be used to aid the driver in picking up the user as a passenger, such as may be useful for a taxi, a ride-share system, vertical takeoff and landing (VTOL) vehicle, and/or the like.

In some embodiments, safety device 100 and/or safety and alert application 120 may also be used for other safety applications. In some examples, safety and alert application 120 may be used to alert an emergency response system (e.g., 911) when a collision occurs, when the biometric sensor(s) detect a undesirable health condition (e.g., atrial fibrillation, heart attack, stroke, fainting, falling, and/or the like), and/or the like.

In some embodiments, safety device 100 and/or safety and alert application 120 may also be used for non-pedestrian applications. In some examples, a safety device may be used by a bicyclist, motorcyclist, skate boarder, roller blader, and/or the like to increase their safety around AVs. In some examples, a safety device may be used with strollers, pets, and/or the like.

In sum, a safety device alerts nearby AVs of the presence of a user. The safety device uses a wireless transmitter to broadcast the alerts to the AVs. The safety device includes one or more input devices, such as sensors, to determine user preferences, contextual information, and/or situational information. The safety device then configures the alerts (e.g., frequency, power, transmission parameters, content, and/or the like) based on the user preferences, contextual information, and/or situational information. The alerts are then broadcast to nearby AVs and/or other systems to alert the nearby AVs and/or other systems of the presence of the safety device and the user of the safety device. In some embodiments, the safety device can be implemented as a wearable device, such as a bracelet, or in an easily carried electronic device, such as audio headphones, a mobile phone, and/or the like.

At least one advantage and technological improvement of the disclosed techniques is a wearable or other easily carried safety device that can provide alerts to nearby AVs of the presence of a user (e.g., a pedestrian or other individual) on or near roadways. Accordingly, the safety device can affirmatively notify the AVs of the presence of the user rather than the user having to passively rely on the environment sensors of the AV to detect the user. Additionally, the alerts can be used to provide an actual position of the user rather than a position that the AV has to infer from environmental sensor data. Further, the safety device can adjust the properties and/or the content of the alerts manually based on user preference and/or automatically based on contextual and/or situational information. Another advantage and technological improvement is that the safety device can be used to request an AV to perform a safety action. A further advantage and technological improvement is that the safety device can interact with other roadway systems, such as traffic lights, crosswalks, and/or the like to further improve the safety and/or convenience of the user.

1. In some embodiments, a safety device comprises a wireless transceiver, a memory storing an application, and one or more processors. The one or more processors, when executing the application, are configured to determine a context of a safety device, configure an alert based on the determined context, and broadcast the configured alert using the wireless transceiver.

2. The safety device of clause 1, wherein the safety device is a wearable device.

3. The safety device of clauses 1 or 2, wherein the safety device is included in another electronic device.

4. The safety device of any of clauses 1-3, wherein the configured alert is broadcast to one or more autonomous vehicles or a traffic control system.

5. The safety device of any of clauses 1-4, wherein the one or more processors are further configured to determine a position of the safety device and include the position of the safety device in the alert.

6. The safety device of any of clauses 1-5, wherein to determine the context of the safety device, the one or more processors are configured to determine whether a position of the safety device is within a predetermined distance of a roadway or other area where an autonomous vehicle is likely to be operated.

7. The safety device of any of clauses 1-6, wherein to determine the context of the safety device, the one or more processors are configured to determine whether a position of the safety device is within a roadway or other area where an autonomous vehicle is likely to be operated.

8. The safety device of any of clauses 1-7, wherein the one or more processors are further configured to determine a position and a velocity of the safety device, include a request that a responding autonomous vehicle return a position and a velocity or the position and a path of the responding autonomous vehicle, receive the position and the velocity or the position and the path of the responding autonomous vehicle, determine, based on the position and the velocity or the position and the path of the responding autonomous vehicle, whether a projected position of the responding autonomous vehicle is within a predetermined distance of a projected position of the safety device determined from the position and velocity of the safety device, and in response to determining that the projected position of the responding autonomous vehicle is within the predetermined distance of the projected position of the safety device, alert a user of the safety device of a high risk of a collision and transmit a collision risk alert to the responding autonomous vehicle of the high risk of the collision.

9. The safety device of any of clauses 1-8, wherein the collision risk alert comprises a request that the responding autonomous vehicle perform a safety action.

10. The safety device of any of clauses 1-9, wherein the safety action comprises at least one of slow down, stop, change direction, emit a sound, or flash a light.

11. In some embodiments, a computer-implemented method comprising determining a context of a safety device, configuring an alert based on the determined context, and broadcasting the configured alert using a wireless transceiver.

12. The method of clause 11, wherein determining the context comprises switching the safety device to a basic alert mode, an enhanced alert mode, a high alert mode, or a user request mode and indicating to a user of a new mode of the safety device.

13. The method of clauses 11 or 12, further comprising determining a position of the safety device, wherein configuring the alert further comprises including the position of the safety device in the alert.

14. The method of any of clauses 11-13, wherein determining the context of the safety device comprises determining at least one of whether a position of the safety device is within a predetermined distance of a roadway or other area where an autonomous vehicle is likely to be operated or whether the position of the safety device is within a roadway or other area where an autonomous vehicle is likely to be operated.

15. The method of any of clauses 11-14, wherein determining the context of the safety device comprises determining whether a user of the safety device is demonstrating less predictable behavior or is distracted.

16. The method of any of clauses 11-15, wherein configuring the alert comprises configuring at least one of a power level, a frequency range, a number of communication channels, a priority, or a broadcast interval of the configured alert based on an operating mode of the safety device.

17. The method of any of clauses 11-16, further comprising rebroadcasting the configured alert using at least one of an increased power level, a wider frequency range, a greater number of communication channels, or a higher priority when an acknowledgment of the broadcasting of the configured alert is not received from an autonomous vehicle.

18. In some embodiments, one or more non-transitory computer-readable storage media including instructions that, when executed by one or more processors, cause the one or more processors to perform steps of determining a context of a safety device, configuring an alert based on the determined context, and broadcasting the configured alert using a wireless transceiver.

19. The one or more non-transitory computer-readable storage media of clause 18, wherein determining the context of the safety device comprises determining at least one of whether a position of the safety device is within a predetermined distance of a roadway or other area where an autonomous vehicle is likely to be operated, whether the position of the safety device is within a roadway or other area where an autonomous vehicle is likely to be operated, or whether a user of the safety device is demonstrating less predictable behavior or is distracted.

20. The one or more non-transitory computer-readable storage media of clauses 18 or 19, wherein the steps further comprise receiving input from a user to send a request to an autonomous vehicle or a traffic control system and in response to receiving the input, broadcasting the request to the autonomous vehicle or the traffic control system using the wireless transceiver.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A wearable safety device, comprising:
a wireless transceiver;
a memory storing an application; and
one or more processors that, when executing the application, are configured to:
determine, based on position data of the wearable safety device, a risk that one or more autonomous vehicles will collide with a user wearing the wearable safety device, the user being external to any vehicle;
generate, based on the determined risk, a collision risk alert; and
upon generating the collision risk alert, broadcast the collision risk alert using the wireless transceiver to the one or more autonomous vehicles, wherein the collision risk alert includes a request for the one or more autonomous vehicles to emit an alert sound or alert light.

2. The wearable safety device of claim 1, wherein the wearable safety device is included in another electronic device.

3. The wearable safety device of claim 1, wherein the one or more processors are further configured to:
determine a position of the wearable safety device; and
include the position of the wearable safety device in the collision risk alert.

4. The wearable safety device of claim 1, wherein to determine the risk, the one or more processors are configured to determine whether a position of the wearable safety device is within a predetermined distance of a roadway, or an area where the one or more autonomous vehicles are likely to be operated.

5. The wearable safety device of claim 1, wherein to determine the risk, the one or more processors are configured to determine whether a position of the wearable safety device is within a roadway, or an area where the one or more autonomous vehicles are likely to be operated.

6. The wearable safety device of claim 1, wherein the one or more processors are further configured to:
   determine a position and a velocity of the wearable safety device;
   generate a second request that a responding autonomous vehicle of the one or more autonomous vehicles return a position and a velocity, or the position and a path, of the responding autonomous vehicle;
   receive the position and the velocity, or the position and the path, of the responding autonomous vehicle;
   determine, based on the position and the velocity, or the position and the path, of the responding autonomous vehicle, whether a projected position of the responding autonomous vehicle is within a predetermined distance of a projected position of the wearable safety device determined from the position and velocity of the wearable safety device; and
   in response to determining that the projected position of the responding autonomous vehicle is within the predetermined distance of the projected position of the wearable safety device:
      alert the user of the wearable safety device of a high risk of a collision, and
      transmit the collision risk alert to the responding autonomous vehicle of the high risk of the collision.

7. The wearable safety device of claim 6, wherein the collision risk alert further includes a third request that the responding autonomous vehicle perform a safety navigation action.

8. The wearable safety device of claim 7, wherein the safety navigation action comprises at least one of slow down, stop, or change direction.

9. A computer-implemented method, comprising:
   determining, by one or more processors of a wearable safety device based on position data of the wearable safety device, a risk that one or more autonomous vehicles will collide with a user wearing the wearable safety device, the user, being external to any vehicle;
   generating, by the one or more processors and based on the determined risk, a collision risk alert; and
   upon generating the collision risk alert, broadcasting, by the one or more processors using a wireless transceiver, the collision risk alert to the one or more autonomous vehicles, wherein the collision risk alert includes a request for the one or more autonomous vehicles to emit an alert sound or alert light.

10. The computer-implemented method of claim 9, wherein the step of determining the risk comprises:
    switching the wearable safety device to a new mode comprising one of an enhanced alert mode, a high alert mode, or a user request mode; and
    indicating, to the user, of the new mode of the wearable safety device.

11. The computer-implemented method of claim 9, further comprising:
    determining, by the one or more processors, a position of the wearable safety device,
    wherein the step of generating the collision risk alert further comprises including the position of the wearable safety device in the collision risk alert.

12. The computer-implemented method of claim 9, wherein the step of determining the risk comprises determining at least one of:
    whether a position of the wearable safety device is within a predetermined distance of a roadway, or an area where the one or more autonomous vehicles are likely to be operated; or
    whether the position of the wearable safety device is within the roadway, or an area where the one or more autonomous vehicles are likely to be operated.

13. The computer-implemented method of claim 9, wherein the step of determining the risk comprises determining whether the user of the wearable safety device:
    is moving faster than a predetermined speed,
    has made multiple changes in direction within a defined time period, or
    is distracted.

14. The computer-implemented method of claim 9, wherein the step of generating the collision risk alert comprises configuring, based on an operating mode of the wearable safety device at least one of a power level, a frequency range, a number of communication channels, a priority, or a broadcast interval of the collision risk alert.

15. The computer-implemented method of claim 9, further comprising, when an acknowledgement of the broadcasting of the collision risk alert is not received from at least one autonomous vehicle of the one or more autonomous vehicles, rebroadcasting the collision risk alert using at least one of an increased power level, a wider frequency range, a greater number of communication channels, or a higher priority.

16. One or more non-transitory computer-readable storage media including instructions that, when executed by one or more processors of a wearable safety device, cause the one or more processors to perform steps of:
    determining, based on position data of the wearable safety device, a risk that one or more autonomous vehicles will collide with a user wearing the wearable safety device, the user, being external to any vehicle;
    generating, based on the determined risk, a collision risk alert; and
    upon generating the collision risk alert, broadcasting the collision risk alert using a wireless transceiver to the one or more autonomous vehicles, wherein the collision risk alert includes a request for the one or more autonomous vehicles to emit an alert sound or alert light.

17. The one or more non-transitory computer-readable storage media of claim 16, wherein the step of determining the risk comprises determining at least one of:
    whether a position of the wearable safety device is within a predetermined distance of a roadway, or an area where the one or more autonomous vehicles are likely to be operated; or
    whether the position of the wearable safety device is within the roadway, or an area where the one or more autonomous vehicles are likely to be operated; or
    whether the user of the wearable safety device:
       is moving faster than a predetermined speed,
       has made multiple changes in direction within a defined time period, or
       is distracted.

18. The one or more non-transitory computer-readable storage media of claim 16, wherein the steps further comprise:
- receiving input from the user to send a user request to the one or more autonomous vehicles or a traffic control system; and
- in response to receiving the input, broadcasting the user request to the one or more autonomous vehicles or the traffic control system using the wireless transceiver.

* * * * *